United States Patent [19]

Obata et al.

[11] Patent Number: 4,889,678
[45] Date of Patent: Dec. 26, 1989

[54] CASTING A PLASTIC WINDSHIELD

[75] Inventors: Keiichi Obata; Suguru Yoshida; Masahiro Saitoh; Yoshinobu Ono, all of Saitama, Japan

[73] Assignee: Honda Giken Kogyo Kabushiki Kaisha, Tokyo, Japan

[21] Appl. No.: 200,619

[22] Filed: May 31, 1988

[30] Foreign Application Priority Data

May 29, 1987 [JP] Japan .................................. 62-134188
May 29, 1987 [JP] Japan .................................. 62-82651

[51] Int. Cl.4 ........................................... B29C 39/02
[52] U.S. Cl. .................... 264/313; 264/316; 264/336; 264/261; 249/82; 249/154
[58] Field of Search ................... 264/2.2, 2.3, 313, 2.4, 264/316, 336, 261, 219; 425/808; 249/82, 154

[56] References Cited

U.S. PATENT DOCUMENTS 4,227,673 10/1980 Goodwin et al. ..................... 264/2.2

FOREIGN PATENT DOCUMENTS 0135030 10/1981 Japan ..................................... 264/2.2

Primary Examiner—James Lowe
Assistant Examiner—Kelley M. Krisch
Attorney, Agent, or Firm—Lyon & Lyon

[57] ABSTRACT

An elongate packing is sandwiched between two sheet-like mold members in an encircling manner to define a mold cavity therebetween, then a thermosetting plastic material is poured into the mold cavity, and the thermosetting plastic material is heated and set in the mold cavity. The upper and lower mold members are held against deformation transverse thereof so as not to be deformed by the shrinkage of the thermosetting plastic material when the latter is set, and the packing is allowed to move transversely thereof for following the shrinkage of the thermosetting plastic material when the latter is set. In some embodiments, the packing comprises a packing body adapted to be sandwiched between the mold members for preventing the plastic material from flowing out of the mold cavity with a flange joined to the packing body and adapted to be held against peripheral edges of the mold members.

4 Claims, 3 Drawing Sheets

CASTING A PLASTIC WINDSHIELD

BACKGROUND OF THE INVENTION

The present invention relates to a method of manufacturing a plastic windshield for use on a vehicle such as an automobile, and a packing for use in a mold assembly employed by the method.

Windshields for use on vehicles such as automobiles are generally manufactured by shaping glass sheets to desired curved configuration. Such glass sheets are produced by a floating process in which molten glass flows into a bath containing molten tin or the like. Since the glass sheets thus produced are highly uniform in thickness, any see-through defects that are present in the glass sheets are substantially negligible.

The automobile windshields of glass have proven unsatisfactory, however, with respect to weight, shock resistance, and other properties, although they allow high visibility and transparency.

Attempts have been made to manufacture windshields of plastic materials. Thermoplastic resins such as acrylic resins, polycarbonate resins, and the like which are well moldable are not suitable for use as windshield materials since they are less resistant to abrasion. Thermosetting resins such as diethylene grycol bisallyl carbonate have satisfactory hardness and transparency levels, but are less moldable.

More specifically, when a thermosetting plastic is to be molded, a monomer plastic material is poured into a mold, and then heated so as to be set due to polymerization. Since such a thermosetting plastic material shrinks when it is set, seethrough detects are liable to occur in the windshield produced.

For molding a sheet member such as a windshield of a thermosetting plastic material, it has been customary to sandwich a packing of polyvinyl chloride or ethylene-vinyl acetate between two glass sheets to define a mold cavity therebetween, and then to pour a thermosetting plastic monomer into the mold cavity. Thereafter, the thermosetting plastic monomer is heated so as to be set due to polymerization.

The packing used in the conventional molding process is generally of a solid circular cross section or a hollow circular cross section. It has been quite difficult to position the packing properly between the glass sheets, and hence it has been time-consuming to mold a product to accurate shape. If a large-size product such as an automobile windshield is molded by the mold, the material monomer may sometimes leak through gaps between the mold glass sheets and the packing.

The conventional packing fails to follow the shrinkage of the thermosetting plastic material as it is set under heat. The molded product therefore is irregular in thickness and suffers cracks and/or undulations on its surfaces.

SUMMARY OF THE INVENTION

It is an object of the present invention to provide a method of manufacturing a plastic windshield which is uniform in thickness and free of see-through or visibility defects.

Another object of the present invention is to provide a packing for use in a mold for molding a plastic sheet, the packing being easily positionable between mold members for allowing the plastic sheet of accurate dimensions to be molded.

Still another object of the present invention is to provide a packing for use in a mold for molding a plastic sheet, the packing being capable of following shrinkage of the plastic sheet as it is molded, so that the molded plastic sheet is of uniform thickness, and free of cracks and undulations.

According to the present invention, there is provided a method of manufacturing a plastic sheet comprising the steps of sandwiching an elongate packing between two sheet-like mold members in an encircling manner to define a mold cavity there-between, pouring a thermosetting plastic material into the mold cavity, heating and setting the thermosetting plastic material in the mold cavity, holding the two mold members against deformation thereof toward each other upon shrinkage of the thermosetting plastic material when the latter is set, and allowing the package to move transversely thereof by following the shrinkage of the thermosetting plastic material when the latter is set.

Since the mold members do not follow the shrinkage of the thermosetting material as it is set and the packing is allowed to follow the shrinkage of the thermosetting material, the plastic sheet molded has a uniform thickness.

According to the present invention, there is also provided a packing for use between and encircling two mold members to define a mold cavity therebetween for molding therein a product of a plastic material due to polymerization thereof, the packing comprising a packing body adapted to be sandwiched between the mold members for preventing the plastic material from flowing out of the mold cavity, and a flange joined to the packing body and adapted to be held against peripheral edges of the mold members. The packing body and the flange are spaced at a constant interval from each other by a thin wall extending therebetween. When the packing body is sandwiched between the mold members with the flange held against the peripheral edges thereof, the packing body is spaced a constant distance from the peripheral edges of the mold members.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
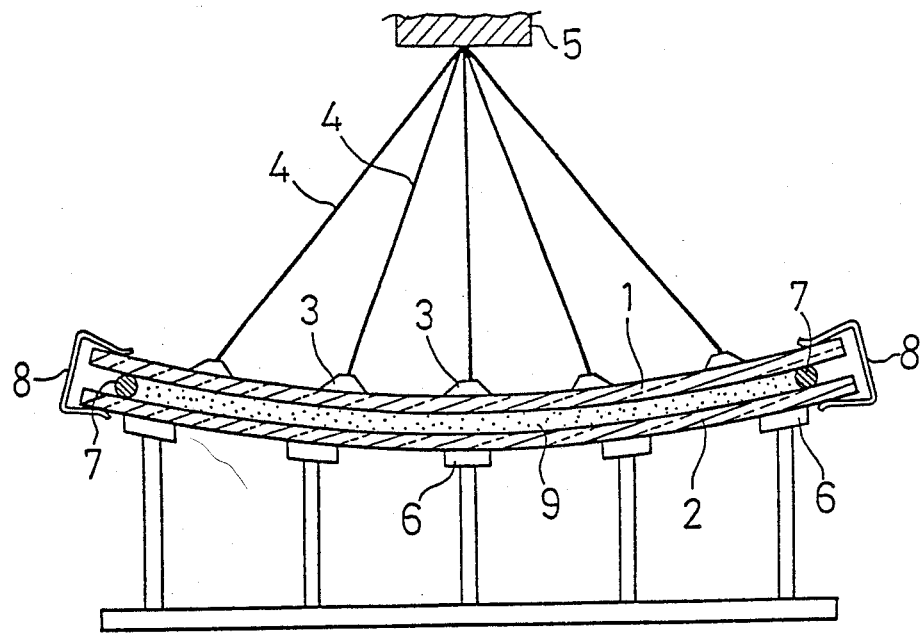
FIG. 1 is a vertical cross-sectional view of a molding apparatus for carrying out a method of the present invention.

Like or corresponding parts are denoted by like or corresponding reference numerals throughout views.

FIG. 1 shows a molding apparatus used for carrying out a method of the present invention for manufacturing a plastic sheet such as an automobile windshield. The molding apparatus comprises upper and lower mold members 1, 2 each in the form of a glass sheet tempered for making a surface of a plastic sheet as smooth as a glass sheet surface. Preferably, the upper and lower mold members 1, 2 are a pair of glass sheets which can be combined into a sandwich glass by being joined to each other by an intermediate film of polyvinyl butyral. The upper and lower mold members 1, 2 of such sandwich glass sheets can define a mold cavity of uniform thickness therebetween.

The upper mold member 1 has an upper surface attracted under suction by vacuum cups 3 (also shown in FIG. 2) applied at spaced positions to the upper surface of the upper mold member 1. The vacuum cups 3 are supported by a fixed member 5 through respective wires 4. The lower mold member 2 has a lower surface mounted on a plurality of support legs 6 disposed at spaced locations. The upper and lower mold members 1, 2 thus supported are prevented from being deformed toward each other in response to shrinkage of a plastic material which is molded between the upper and lower mold members 1, 2.

A plastic sheet such as an automobile windshield can be molded by the molding apparatus as follows: An elongate packing 7 made of a relatively soft material such as a copolymer of polyvinyl chloride and ethylene-vinyl acetate or only ethylene vinyl acetate is sandwiched between the upper and lower mold members 1, 2 in a manner to encircle the mold members near the edges, thus defining a mold cavity therebetween encircled by the packing. Then, the upper and lower mold members 1, 2 are fastened together by clamps 8. A thermosetting plastic monomer 9 such as diethylene grycol bisallyl carbonate is poured into the die cavity surrounded between the upper mold member 1, the lower mold member 2, and the packing 7, and then heated for polymerization and set.

The thermosetting plastic material such as diethylene grycol bisallyl carbonate is caused to shrink when it is set. Since the upper mold member 1 is suspended by the vacuum cups 3 and the lower mold member 2 is mounted on the support legs 6, the upper and lower mold members 1, 2 are prevented from being deformed especially at their central areas upon shrinkage of the plastic material as it is set. The packing 7 is however easily moved inwardly or collapsed upon shrinkage of the plastic material since the packing 7 is of the relatively soft material. Therefore, the packing 7 takes up the amount by which the plastic material shrinks.

Therefore, by positioning the packing 7 slightly outwardly of a position corresponding to the desired windshield shape before the molding process, a windshield of desired thickness and dimensions can be produced.

Figure 2:
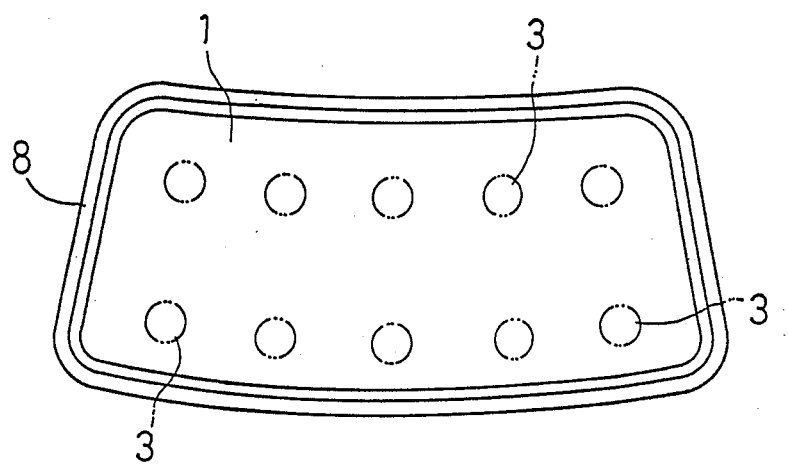
FIG. 2 is a plan view of the molding apparatus shown in FIG. 1.

In the arrangement shown in FIGS. 1 and 2, the upper and lower mold members 1, 2 are prevented from being deformed by the vacuum cups 3 and the support legs 6. However, the upper and lower mold members 1, 2 may be prevented from being deformed by other suitable means.

The upper and lower mold members 1, 2 are therefore not deformed toward each other by the shrinkage of the plastic material 9. Therefore, the produced windshield is of uniform thickness and free from see-through defects.

Figure 3:
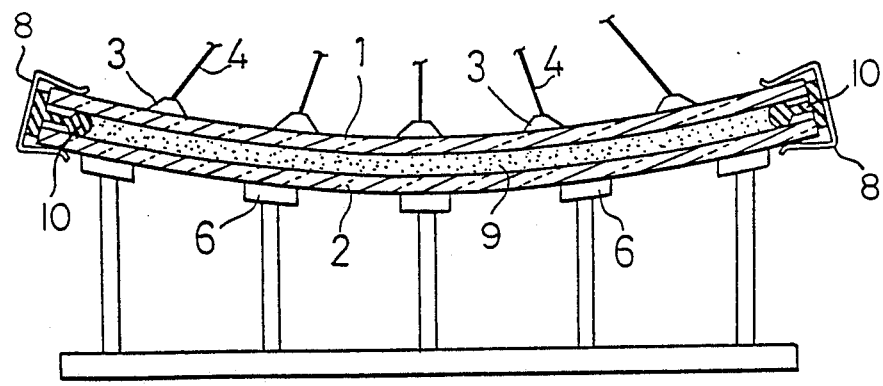
FIG. 3 is a vertical cross-sectional view of a molding apparatus employing a packing according to the present invention.

FIG. 3 illustrates a molding apparatus incorporating a packing according to the present invention.

Figure 4:
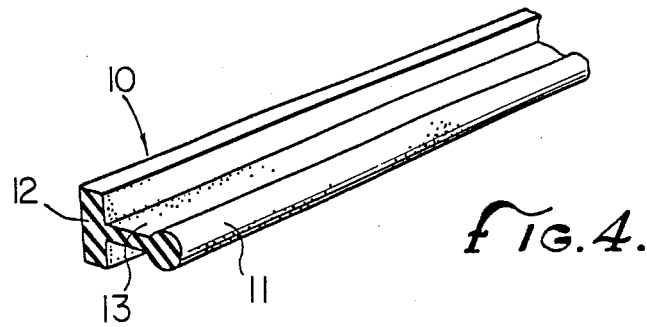
FIG. 4 is an enlarged fragmentary perspective view of the packing shown in FIG. 3.

As shown in FIG. 4, the packing, generally designated 10, placed between the upper and lower mold members 1, 2 and defining a mold cavity therebetween extends along the peripheral edges of the upper and lower mold members 1, 2. The packing 10 comprises a packing body 11 of circular cross section and a flange 12 of rectangular cross section joined along its central area to the packing body 11 through a thin wall 13 extending therebetween. The packing 10 is made of a copolymer of polyvinyl chloride and ethylene-vinyl acetate, or only ethylene-vinyl acetate. With the packing 10 disposed between the upper and lower mold members 1, 2, the packing body 11 is sandwiched between the upper and lower mold members 1, 2, and the flange 12 is positioned outwardly of the upper and lower mold members 1, 2 and held against the outer peripheral edges thereof.

For producing a plastic sheet such as an automobile windshield in the molding apparatus, the packing body 11 is sandwiched between the upper and lower mold members 1, 2 with the flange 12 held against the outer edges thereof, thus defining a mold cavity between the upper and lower mold members 1, 2. The upper and lower mold members 1, 2 are fastened together by means of clamps 8 engaging the outer peripheries thereof. Then, a thermosetting plastic material monomer 9 is poured into the mold cavity. The poured monomer is then heated so that it is polymerized and set. During shrinkage of the monomer 9 during settling, the packing body 11 moves inwardly to follow the shrinking monomer 9 and the thin wall 13 stretches to accommodate that movement.

Inasmuch as the packing 10 is accurately positioned with respect to the upper and lower mold members 1, 2 by the flange 12, the molded sheet product is accurately shaped and dimensioned.

Figure 5:
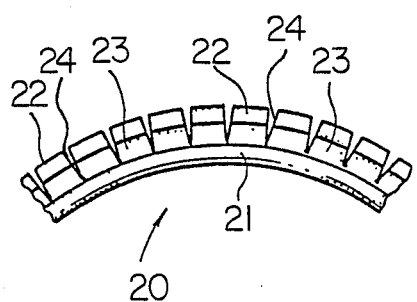
FIGS. 5 and 6 are fragmentary plan views of packings according to other embodiments.

FIG. 5 shows a packing 20 similar to packing 10 including a packing body 21 of circular cross section and a flange 22 of rectangular cross section joined to the packing body 21 by a thin wall 23, the flange 22 and the wall 23 having recesses 24 cut at spaced intervals. The recesses 24 make the packing 20 more flexible to allow the packing body 21 to be easily curved with the flange 22 on the convex side.

Figure 6:
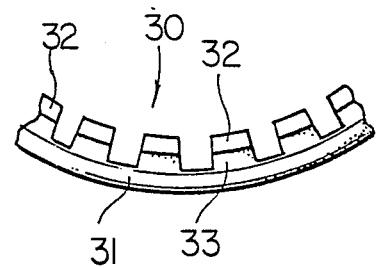

According to another embodiment shown in FIG. 6, a packing 30 similar to packings 10 and 20 has a packing body 31 of circular cross section and a flange 32 of rectangular cross section joined to the packing body 31 by a thin wall 33, the flange 32 and the wall 33 having a comb-tooth shape which allows the packing body 31 to be easily curved with the flange 32 on the concave side.

Figure 7:
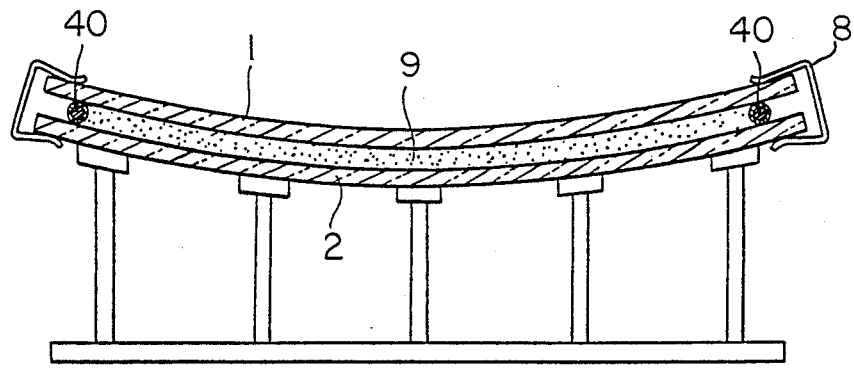
FIG. 7 is a vertical cross-sectional view of a molding apparatus employing a packing according to still another embodiment of the present invention.
Figure 8:
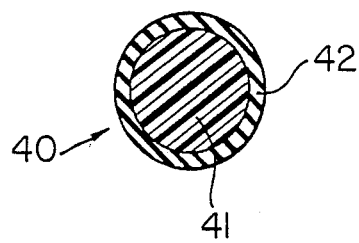
FIG. 8 is a transverse cross-sectional view of the packing illustrated in FIG. 7.

FIG. 7 shows a molding apparatus employing a packing 40 according to still another embodiment of the present invention. The packing 40 disposed between the upper and lower mold members 1, 2 along their outer peripheral edges comprises, as illustrated in FIG. 8, a core 41 of circular cross section made of a synthetic resin such as polyvinyl chloride (PVC) or ethylene-vinyl acetate (EVA), and an elastomeric layer 42 made of an elastomer such as stylene-butadience rubber (SBR), low-density polyethylene or soft vinyl chloride fitted over the core 41.

When a thermosetting plastic material monomer 9 is poured into the mold cavity defined between the upper and lower mold members 1, 2 by the packing 40 and is polymerized and set, the monomer 9 shrinks. Since the packing 40 has the outer elastomeric layer 42, the packing 40 is elastically collapsed as it follows the shrinkage of the plastic monomer 9.

With the packing 40 thus elastically deformed by following the shrinkage of the plastic monomer 9, the molded sheet product is uniform in thickness and is free from cracks and undulations.

Although certain preferred embodiments have been shown and described, it should be understood that many changes and modifications may be made therein without departing from the scope of the appended claims.

What is claimed is:

1. A method of manufacturing a large, thin plastic sheet comprising the steps of:
    sandwiching an elongate packing between two large sheet-like mold members in an encircling manner to define a large, thin mold cavity therebetween;
    pouring a thermosetting plastic material into said mold cavity;
    heating and setting the thermosetting plastic material in said mold cavity;
    holding said two mold members each at a plurality of points to prevent deformation in a direction toward each other upon shrinkage of the thermosetting plastic material when the latter is set; and
    allowing said packing to move transversely inwardly of the mold cavity for following the shrinkage of the thermosetting plastic material when the latter is set.

2. A method according to claim 1, wherein said mold members are fixedly supported.

3. A method according to claim 1, wherein said mold members are clamped together after said packing is sandwiched between the mold members.

4. A method of manufacturing a large, thin plastic sheet comprising the steps of:
    sandwiching an elongate packing between two large sheet-like mold members in an encircling manner to define a thin mold cavity therebetween and clamping said mold members together along their respective peripheries after said packing is sandwiched between said mold members;
    pouring a thermosetting plastic material into said mold cavity;
    heating and setting the thermosetting plastic material in said mold cavity;
    holding said two mold members against deformation in a direction toward each other upon shrinkage of the thermosetting plastic material when the latter is set; and
    allowing said packing to move inwardly within the mold cavity for following the shrinkage of the thermosetting plastic material when the latter is set.

* * * * *